United States Patent [19]

Hahn

[11] Patent Number: 4,828,784
[45] Date of Patent: May 9, 1989

[54] METHOD OF PRODUCING A LAYER OF PLASTICS MATERIAL BETWEEN TWO GLASS PANES AND APPARATUS FOR PERFORMING THE METHOD

[75] Inventor: Thomas O. Hahn, Frankfurt am Main, Fed. Rep. of Germany

[73] Assignee: UCB S.A., Brussels, Belgium

[21] Appl. No.: 105,385

[22] PCT Filed: Dec. 20, 1986

[86] PCT No.: PCT/EP86/00769
§ 371 Date: Aug. 19, 1987
§ 102(e) Date: Aug. 19, 1987

[87] PCT Pub. No.: WO87/03841
PCT Pub. Date: Jul. 2, 1987

[30] Foreign Application Priority Data

Dec. 21, 1985 [DE] Fed. Rep. of Germany ....... 3545553

[51] Int. Cl.$^4$ ................. B29C 35/08; B32B 17/10
[52] U.S. Cl. ................. 264/316; 249/82; 264/261; 425/356; 425/363; 425/425; 425/447
[58] Field of Search ............. 264/216, 261, 316; 425/356, 363, 425, 447; 249/82

[56] References Cited

U.S. PATENT DOCUMENTS

| | | | |
|---|---|---|---|
| 2,020,178 | 11/1935 | Haas | 264/261 |
| 2,279,145 | 4/1942 | Ryan | 264/216 |
| 3,257,484 | 6/1966 | Barnette | 264/261 |
| 3,376,371 | 4/1968 | Opel et al. | 264/216 |
| 3,422,178 | 1/1969 | Junker et al. | 264/216 |
| 3,708,566 | 1/1973 | Junker et al. | 264/216 |
| 3,872,197 | 3/1975 | Kato et al. | 264/216 |
| 4,234,533 | 11/1980 | Langlands | 264/261 |

Primary Examiner—James Lowe
Attorney, Agent, or Firm—Joseph J. O'Keefe

[57] ABSTRACT

A method of producing a layer of plastics material between two glass panes and an apparatus for performing said method, wherein the plastics material is filled in liquid form between the two glass panes which are in an inclined or vertical position and maintained parallel and sealed at their outer edges, are characterized in that the two glass panes are pressed against each other at their outer surfaces by one or a plurality of rotatable devices to achieve pressure guided in parallel and extending preferably over the total width of the glass panes, which pressure devices are movable along the total length of the glass panes, and that the pressure devices are moved at the curing rate of the plastics material from one end of the glass panes to the other end of the glass panes relative thereto.

21 Claims, 3 Drawing Sheets

METHOD OF PRODUCING A LAYER OF PLASTICS MATERIAL BETWEEN TWO GLASS PANES AND APPARATUS FOR PERFORMING THE METHOD

The present invention relates to a method and to an apparatus for performing the method of producing a layer or lamina of plastics material between the two glass panes, wherein the plastics material in liquid form is fed between the two glass panes being maintained parallel and sealed at the outer edges thereof and a pressure is exerted on the surfaces of the glass panes.

Such methods and apparatus are already known. DE-AS No. 22 26 342, for example, specifies a method of producing a laminated glass comprising two glass panes bonded together by intermediate layer of self-curing, transparent plastics material capable of being cast, said two glass panes with a spacer separating and sealing the glass panes only at the edges thereof, being leant in vertical position against a tiltable plate and the space between them being filled at least in part with the liquid plastics material, the plate together with the two glass panes is then tilted slowly towards the horizontal position whereby a bulge or bowing in the glass pane averted from said plate resulting from the pressure of the liquid plastics material in the vertical position is re-formed whereby the plastics material fills the whole space between the glass panes until an opening provided in the spacer for the ventilation is closed. The recession or reformation of the bulge of the glass pane may also be effected additionally by means of a suction cup connected by a hose to a subpressure source.

Furthermore, from DE-OS No. 27 28 762 a method is known of producing a laminated glass pane, wherein the space between two horizontal panes maintained parallel to each other by a spacer is filled with a plastics material. Measures to avoid the tendency of the glass panes to bulge outwards and inwards, respectively, which is caused by the pressure of the plastics material filled in and by the weight of the upper glass pane, are not considered in said publication.

Another method of producing laminated glass panes is specified in DE-OS No. 26 06 569. According to said method, the plastics material is filled into the interspace between the two glass panes in the inclined position and the curing proper takes place in the horizontal position.

Further, from DE-PS No. 27 37 740 a method is known of producing a laminated glass consisting of two glass panes and one intermediate layer wherein an already finished layer of plastics material is glued as intermediate layer between the glass panes, and the glass panes are pressed against the layer of plastics material by means of rotatable rollers in order to avoid gas bubbles in the adhesive lamina. This method of bonding glass plates and intermediate layer is, however, expensive and requires, moreover, a pre-fabricated layer of plastics material.

CH-PS No. 574 371 relates to a sound-absorbing glazing in the form of a laminated body of two glass panes surrounding a layer of plastics material. In a method of producing such a laminated body the glass panes are placed in a water reservoir in the vertical position for filling in the plastics material. In order to prevent the tendency of the glass panes to bulge, the process is carried out with different water levels depending on the pressure ratios and thickness of the glass panes. This method does not limit the hydrostatic pressure but compensates by hydrostatic counterpressure the continuously increasing hydrostatic pressure which is extraordinarily high in case of large glass panes. The elaborate and complicated character of this method due to the large pressure-stable water reservoir is obvious and does, moreover, not guarantee that the opposing glass panes are plane-parallel, which is rendered still more difficult because, as it is known, self-supporting glass panes are not entirely vertical.

It is the object of the invention to provide a method which can be performed with simple means and a simple device for performing said method which allows the production of flawless panes of plastics material and/or laminated glass panes.

In the method according to the invention filling process and curing process are combined whereby a large number of technical problems are overcome as they occur e.g. when the glass panes are brought in the vertical position to render possible a good inflow of the plastics material and to avoid inclusions of air bubbles. With the filling and curing process according to the invention a high static pressure which would destroy the necessarily soft sealing of the edges and would cause a tendency of outward bulging of the glass panes is not built-up even when the panes are set up vertically. The production of glass panes of a uniform thickness and very large dimensions is guaranteed. It is no problem to separate the finished sheet of plastics material from the glass panes when a plastics material is used which does not react with glass or when the inner surfaces of the glass panes are provided with separating agents before the filling process is started. In particular the method according to the invention gives the possibility of the combined production of very long laminas of plastics material. In particular, it is possible to produce laminated glass panes by the method according to the invention in a simple way and of high quality. Laminas of plastics material may be obtained up to any arbitrary filling level which are flawless and free of air bubbles.

Due to the quick curing of the plastics material it is possible that the devices to achieve a pressure (pressure devices) keep the glass panes separated at an exact distance during the filling process, that a quick polymerisation of the plastics material is initiated, and that the plastics material now solidifying has no flow properties anymore which would cause a bulging-out of the glass panes. For this purpose the pair of glass panes can be positioned vertically or inclined on a solid support and the uniform distance (between the glass panes) during the filling process can be controlled from one side e.g. by means of a course of rollers or drums. When a glass pane is in a preferred vertical position, oppositely arranged devices to achieve pressure can also be carried along in conformity with the filling process whereby it is e.g. also possible to fill the interspace of bent glass panes. The method according to the invention also allows a sandwich arrangement of more than two glass panes at adjustable distances.

The apparatus according to the invention is a simple construction and requires only substantially arbitrary devices to achieve pressure and means for moving said devices and/or glass panes to effect the relative movement between glass panes and said devices at the curing rate of the plastic material.

It may be advantageous to hold the glass panes in an inclined position during the production process whereby the static pressure is reduced and the total height of the arrangement is reduced to low dimensions also in case of large panes.

A further development of the invention is that the plastics material is rapidly curable by intense external radiation. When a plastics material is used which is curable by, for instance, intense ultraviolet radiation, the curing rate may be determined quite exactly. In order to consider production errors due to aging processes of the radiation source, its intensity can be regulated.

A further development of the invention is that one or more radiation sources are located before or behind one of the two devices to achieve pressure and are movable together with them. Depending on the sensitivity of the material to be radiated and its thickness the curing rate can be determined by switching on a plurality of light sources respectively arranged between said devices.

A further development of the invention is that the plastics material is fed in in conformity with the rate of motion of the pressure devices which are respectively guided in the area of the liquid surface of the plastics material. This allows that only the rate of inflow of the plastics material must be controlled when the rate of the pressure devices and light sources is constant.

A further development of the invention is that the plastics material is filled in and the devices to achieve pressure are moved such that said devices are always in the area of the liquid surface of the plastics material. A constant filling rate is assumed therefor and the rate of the pressure devices and of the radiation path is adapted to the liquid surface of the plastics material. For example, when the liquid is supplied uniformly, the filling rate is halved when the interspace between the glass panes has been doubled.

A further development of the invention is that the plastics material is curable by heat and that the heat may be supplied via the devices to achieve pressure. This heat supply must not be caused by intense radiation, but a microwave apparatus incorporated for instance in a drum and travelling to and fro, if necessary, is adapted to heat quickly filled-in materials without heating the glass, and to initiate a curing process.

A further development of the invention is that the pressure devices extend over the total width of the glass panes.

A further development of the invention is that the radiation source is arranged between two adjacent pressure devices so that in the area where the plastics material is still liquid the glass panes can be maintained in position by one pressure device, is then hit by a, for instance, intense UV radiation, that then another pressure device follows, and thereafter, perhaps, another intense radiation, then another pressure device etc. This depends on the filling rate, the required radiation intensity, the radiation capacity of the lamps, as well as on the time required by the fed-in plastics material to lose its flow property.

A further development of the invention is that the devices to achieve pressure and the radiation source are not movable but stationary and that the unit of glass panes is passed therethrough in an inclined and vertical position, respectively. The production may be, for example, a continuous production by guiding one pair of glass panes after the other one through the positioning station and, e.g. through the radiation station.

The devices to achieve pressure must not fulfill specific requirements. Besides drums and rollers hoses filled with liquid may be used which have a more gentle effect on the surface. In order to prevent the glass surfaces from being scratched, it is also possible to provide a protective sheet or film between pressure devices and glass panes.

The devices to achieve pressure may be provided alternatively also with pneumatic, hydraulic or mechanic (with spring action) control devices which effect an exact pressure compensation over the total surface of the glass pane when the pressure devices are moved. It is also possible to move air-cushion developing aggregates relative to the glass panes whereby their surfaces are in no way damaged due to the non-contact pressure effect.

A further development of the invention is that it is also possible to process besides non-component plastics materials multi-component materials. When surplus of plastics material (fat edges) occurs in the interspace between the glass panes when the plastics material is filled in, it is possible to convey the liquid to be filled in by means of a thin hose, for instance a sausage skin, into the interspace between the glass panes until up to the upper liquid level and to heave it (the hose) continuously up and outwards with the liquid level. The ratio of processing time to curing time in the presently repeatedly used cast resins which are mixed shortly before they are filled in is approximately 1 : 10. Thus, it may be considered in conjunction with a mixing apparatus that a processing period of 30 seconds is utilized to reach the interspace between the glass panes up to the surface of the plastics material from the proportioning means via the hose. Within a period of 5 minutes a curing has then occured here which is strong enough to at least eliminate the flowability of the material. When the pressure devices have a height of about 1 m it is possible to fill the interspace between the glass panes in 15 minutes up to a height of 3 m. With the presently usual manufacturer's standard stock size for float glass production of 6 m $\times$ 3.21 m it would be possible to produce about 80 m$^2$ per hour. With the present production methods a very complicated machinery and, in particular, very much space is required to produce a glass pane of 6 m $\times$ 3.21 m. A substantial advantage of the invention is that the above production is possible on a base surface of e.g. only 10 to 15 m$^2$. The halls in glass-processing installations have usually the required height of, like in the present case, about 4 m—without a pit.

A further development of the invention is that the vertically positioned or inclined glass pane can be filled with prepared air or a different gas before the liquid plastics material is filled in, which gas is then expelled by the flowing-in and ascending liquid. According to one's desire, the lattice-like polymerisation of plastics material and glass can, in this way, be improved and deteriorated, respectively.

A further development of the invention is that the temperature of the glass pane and of the liquid plastics material to be filled in is different. When, for example, the plastics material to be filled in is heated, a precipitate is formed immediately at the upper edge of the liquid column on the surface of the glass which counteracts the adhesion of plastics material to the glass.

The invention will be explained hereinafter by means of the drawings, wherein

Figure 1:
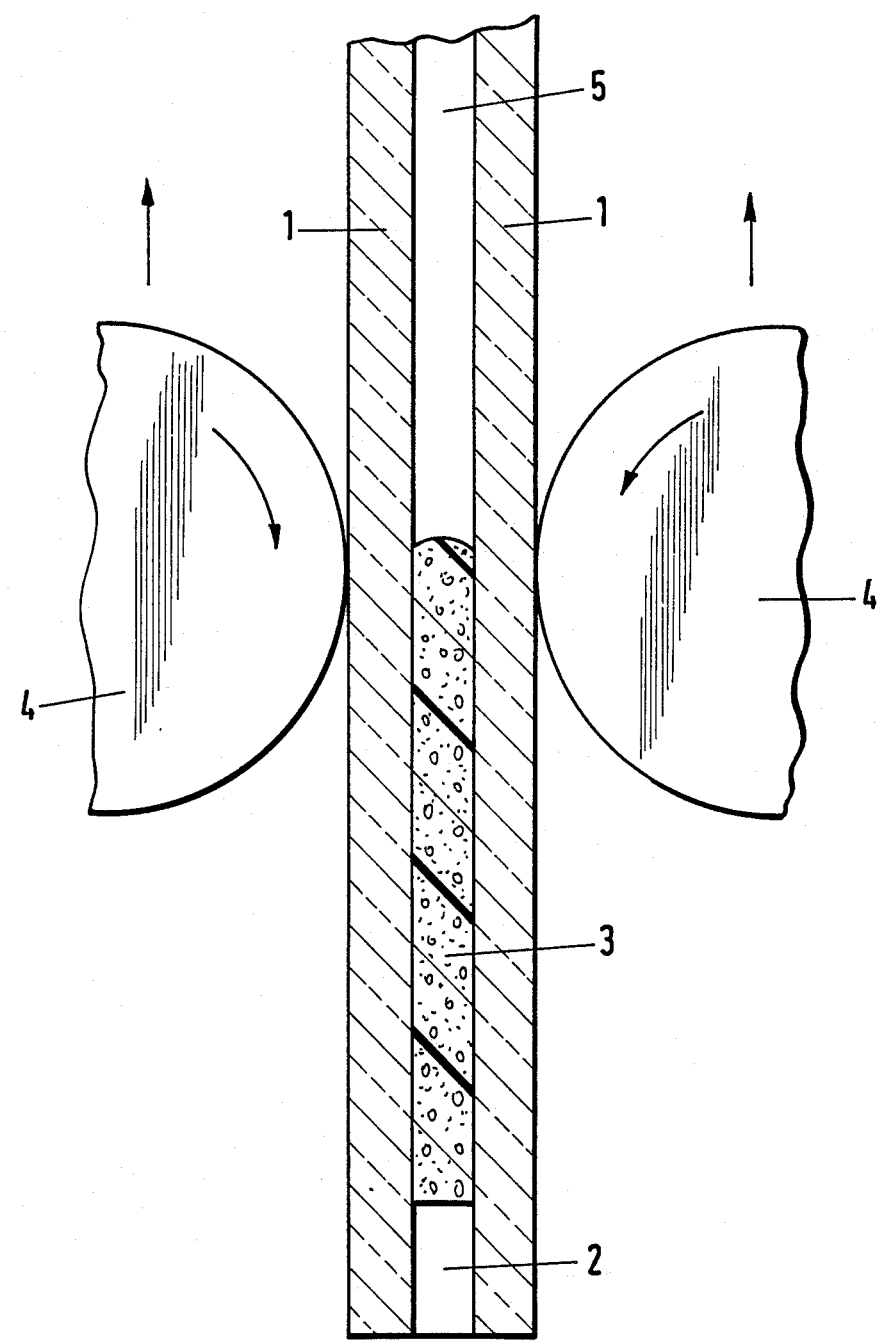
FIG. 1 illustrates an embodiment of the apparatus according to the invention.

FIG. 1 shows a vertically positioned pane unit comprising two glass panes 1, 1 and a spacing piece or a spacer 2 which are held in position by pressure devices in the form of drums or rollers 4 running before and behind (said panes) when liquid plastics material 3 is fed in the interspace 5 between said panes. Especially with a vertical arrangement it is possible to produce pane units of more than two panes 1 at the same time, by filling the interspaces between the glass panes simultaneously with liquid plastics material 3 which requires special attention for example when the distances between the glass panes are different. When the liquid level is maintained always somewhat above the drums, the panes are pressed uniformly against the drums by the static pressure. Multiple glass panes may, however, also be produced one after the other by putting-on another pane and increasing the distance of the holding means to each other.

Figure 2:
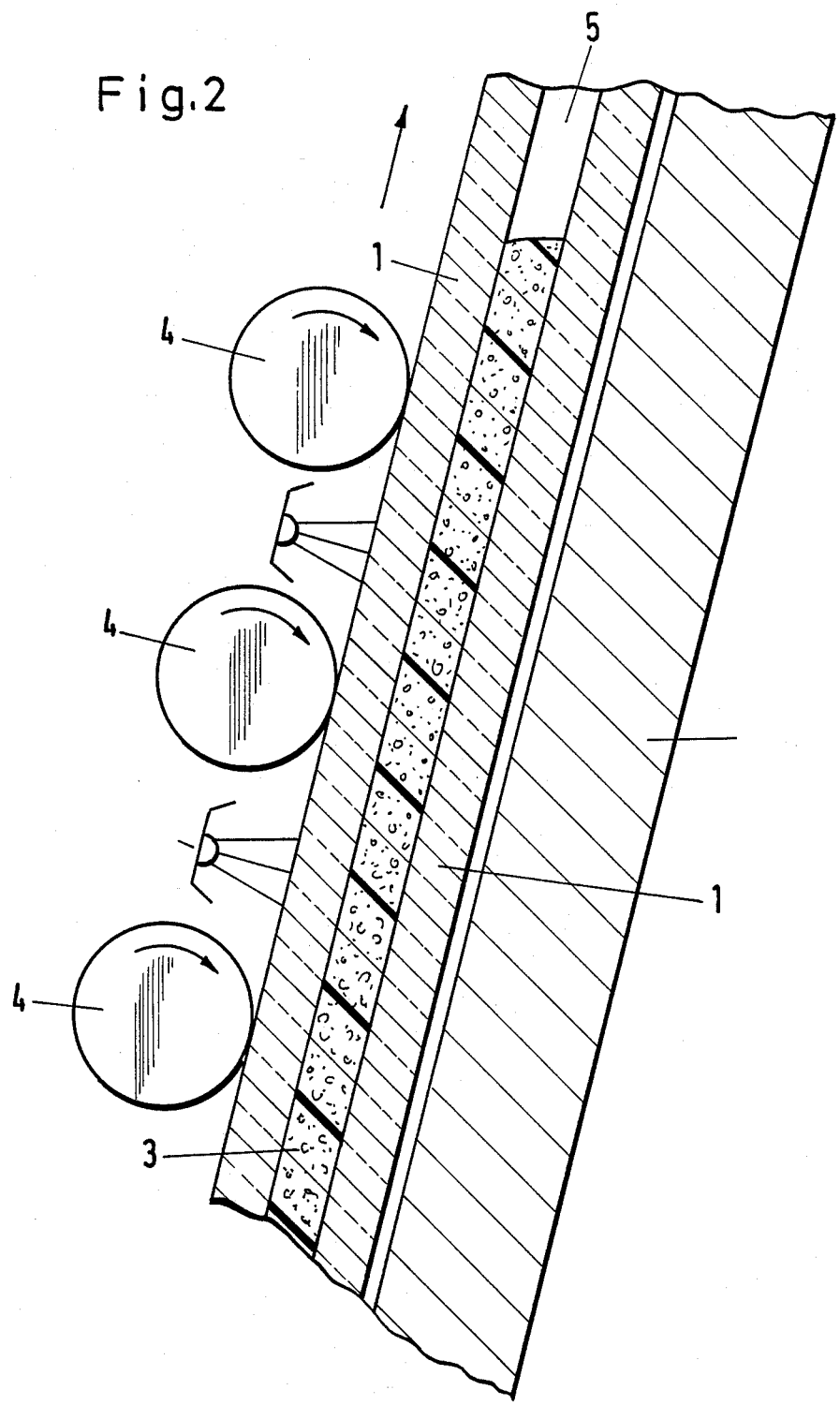
FIG. 2 illustrates another embodiment of the apparatus according to the invention.

FIG. 2 illustrates a table supporting the pane unit and the roller course or assembly is moved together with a curing device provided with radiation sources over the glass surface concurrently with the filling process. During the filling process said table may be positioned vertically or it may be inclined depending on the flowability of the plastics material, on the thickness of the pane or, e.g. also on the available headroom. When the table is at an inclined position the uppermost glass pane is sagging which can easily be compensated by maintaining the filling degree of the glass pane at a somewhat higher level than the concurrent drum and radiation unit, the static pressure pressing the upper glass pane against the roller assembly running above thus guaranteeing an optimum uniform thickness. Contrary to the conventional methods the quantity filled in must not be determined precisely beforehand but the completely filled interspace 5 directs that the filling process can be stopped.

Figure 3:
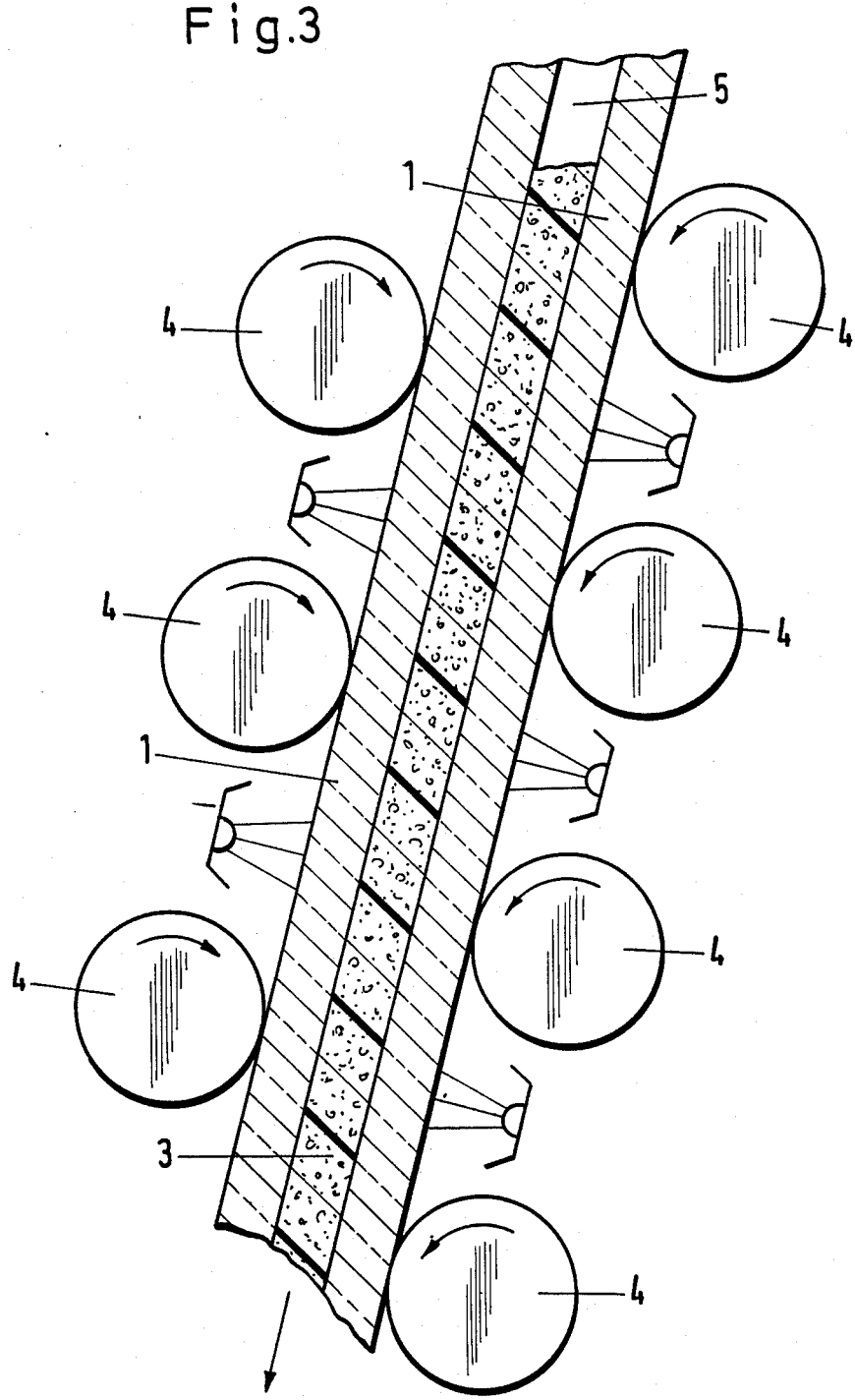
FIG. 3 illustrates an embodiment of the apparatus according to the invention wherein a plurality of drums and radiation sources are provided.

FIG. 3 illustrates a stationary drum and radiation unit through which the glass panes are passed while being filled. The position of said unit is adjusted to be vertical or inclined depending on the consistence of the liquid plastics material.

Contrary to the embodiments according to FIGS. 1 and 2 the latter embodiment does not require a device for moving the devices to achieve pressure. Instead a moving device for moving the glass pane unit must be provided. As both moving means may be implemented in any way desired, it was renounced to illustrate them.

The embodiments were explained in connection with the use of drums as devices to achieve pressure. Meanwhile, however, rotatably mounted rollers turned out to be good in practice. However, also a number of other pressure devices such as those referred to at the beginning are imaginable without cutting down the advantageous effect of the apparatus according to the invention.

I claim:

1. A method of forming a sheet of plastic material in a space between first and second panes, each having a width and a length and an outer surface and inner surface, sealed along the length thereof, wherein the improvement comprises:
    (A) feeding liquid plastic material into the space between the inner surfaces of said panes to form a rising level of plastic material therein;
    (B) applying pressure adjacent the rising level of liquid plastic material by pressure application means extending over about the width of the outer surface of said first pane;
    (C) curing said plastic material and continuing the application of pressure for about the length of said first pane as relative movement of said first and second panes and said pressure application means is effected at about the rate of curing of said plastic material.

2. The method of claim 1 wherein pressure is applied by pressure application means behind and adjacent the rising level of liquid plastic material.

3. The method of claim 1 wherein relative movement of said panes and said pressure application means is effected by moving said panes.

4. The method of claim 1 wherein relative movement of said panes and said pressure application means is effected by moving said pressure application means.

5. The method of claim 4 wherein the rate of movement of said pressure application means is adapted to a given rate of feeding liquid plastic material into the space between said panes.

6. The method of claim 1 wherein relative movement of said panes and said pressure application means is effected by moving said pressure application means in the direction of the rising level of liquid plastic material.

7. The method of claim 1 wherein said plastic material is cured by heat.

8. The method of claim 1 wherein said plastic material is cured by radiation.

9. The method of claim 1 wherein said panes are at an angle to the horizontal.

10. The method of claim 9 wherein said panes are vertical during the feeding of liquid plastic material into the space between said panes.

11. The method of claim 1 wherein said pressure application means includes means for curing said plastic material.

12. The method of claim 1 wherein said liquid plastic material is fed into the space between said first and second panes without wetting the inner faces thereof.

13. A method of forming a sheet of plastic material in a space between first and second glass panes, each having a width and a length and an outer and inner surface, sealed along the lengths thereof, wherein the improvement comprises:
    (A) feeding liquid plastic material into the space between the inner surfaces of said panes to form a rising level of liquid plastic material therein;
    (B) applying pressure over about the width of the outer surface of said first pane by:
        (i) first pressure application means moving adjacent and behind said rising level of liquid plastic material, and
        (ii) second pressure application means spaced from and behind said first pressure application means;
    (C) curing said plastic material during the continuing application of pressure by moving said first and second pressure application means over the length of the outer surface of said first pane at about the rate of curing of said plastic material.

14. The method of claim 13 wherein means for curing said plastic material is mounted between and adjacent said first and second pressure application means and moves therewith to cure said plastic material.

15. The method of claim 13 wherein said liquid plastic material is fed into the space between the inner surfaces of said panes in conformity with the rate of movement of said pressure application means.

16. Apparatus for forming a sheet of plastic material comprising:
(A) a first pane having
(1) an outer surface,
(2) an inner surface,
(3) a length,
(4) a width,
(B) a second pane having
(1) an inner surface,
(C) spacing means positioned between the inner surfaces of said first pane and said second pane to form a space therebetween,
(D) delivery means for feeding liquid plastic material to the space between the inner surfaces of said first and second panes to form a rising level of liquid plastic material;
(E) pressure application means operatively associated with said first pane for exerting pressure on the outer surface thereof adjacent the rising level of liquid plastic material; and
(F) drive means for effecting relative movement of said first and second panes and said pressure application means to cause pressure to be exerted adjacent the rising level of liquid plastic material on the outer surface of said first pane for about the length thereof.

17. The apparatus of claim 16 wherein said pressure application means extends about the width of the outer surface of said first pane.

18. The apparatus of claim 16 wherein curing means is positioned adjacent said pressure application means.

19. The apparatus of claim 16 wherein said curing means is located within said pressure application means.

20. The apparatus of claim 16 whrein said pressure application means is in the form of a rotatably mounted cylindrical device.

21. The apparatus of claim 16 further including pressure application means operatively associated with said second pane for exerting pressure on the outer surface thereof adjacent the rising level of liquid plastic material.

* * * * *